United States Patent [19]

Beaston

[11] Patent Number: 5,004,013

[45] Date of Patent: Apr. 2, 1991

[54] DRIPLESS COUPLING DEVICE

[75] Inventor: Brook J. Beaston, Wichita, Kans.

[73] Assignee: Great Plains Industries, Inc., Wichita, Kans.

[21] Appl. No.: 542,735

[22] Filed: Jun. 22, 1990

Related U.S. Application Data

[63] Continuation-in-part of Ser. No. 367,477, Jun. 16, 1989, which is a continuation of Ser. No. 180,355, Apr. 11, 1988, Pat. No. 4,844,450.

[51] Int. Cl.$^5$ .............................................. F16L 37/28
[52] U.S. Cl. ........................... 137/614.05; 137/614.06; 251/149.5
[58] Field of Search .......... 137/322, 323, 324, 614.03, 137/614.05, 614.06, 637.1, 637.05; 251/149.8, 149.9, 149.5, 89.5

[56] References Cited

U.S. PATENT DOCUMENTS

| | | | |
|---|---|---|---|
| 146,662 | 1/1874 | Earle | 137/323 |
| 629,304 | 7/1899 | Rawlins | 137/614.05 |
| 841,095 | 1/1907 | Osborne | 137/614.05 |
| 1,600,481 | 9/1926 | Nadig | 251/149.8 |
| 2,254,997 | 9/1941 | Fisher | 284/19 |
| 2,304,390 | 12/1942 | Wolfram | 284/19 |
| 2,436,327 | 2/1948 | Pommer | 137/614.01 |
| 2,441,363 | 5/1948 | Krueger | 285/174 |
| 2,451,218 | 10/1948 | Hengst | 284/19 |
| 2,457,251 | 12/1948 | Main, Jr. | 284/19 |
| 2,485,006 | 10/1949 | Main, Jr. et al. | 284/19 |
| 2,493,271 | 1/1950 | Smith et al. | 251/149.9 |
| 2,601,339 | 6/1952 | Snyder | 251/149.8 |
| 2,739,612 | 3/1956 | Hansen | 137/614.05 |
| 2,821,412 | 1/1958 | Frye | 284/18 |
| 3,039,794 | 6/1962 | De Cenzo | 284/19 |
| 3,359,015 | 12/1967 | Zahuranec | 251/149.8 |
| 3,474,827 | 10/1969 | Rosell | 137/614.06 |
| 3,583,667 | 6/1971 | Amneus | 251/149.5 |
| 3,885,608 | 5/1975 | Ayres | 141/354 |
| 4,219,048 | 8/1980 | Ekman | 137/614.03 |
| 4,269,389 | 5/1981 | Ekman | 251/149.6 |
| 4,483,368 | 11/1984 | Panthofer | 137/614.04 |

FOREIGN PATENT DOCUMENTS

| | | | |
|---|---|---|---|
| 545614 | 8/1952 | Canada | 251/149.8 |
| 73748 | 2/1952 | Denmark | 251/149.8 |
| 1120330 | 7/1956 | France | 251/149.5 |
| 425141 | 3/1935 | United Kingdom | 251/149.8 |

Primary Examiner—A. Michael Chambers
Attorney, Agent, or Firm—Bill D. McCarthy; Glen M. Burdick

[57] ABSTRACT

A dripless coupling device in which a male unit and a female unit selectively interconnect flow conducting members, a male barrel having a male cylinder disposed therein which is insertable into a female body. The female body is provided with a dial retainer liner adapted to receive a dialer member such that the male cylinder can be selectively rotated by the dialer member to index the cylinder bore of the male cylinder with the male barrel port of the male cylinder and the liner port and the hollow post of the female body. A seal is formed between the female body and the dialer member when the male unit is disconnected and a biasing assembly is provided for biasing the dialer member into sealing engagement with the seal while permitting the dialer member to be retracted upon connection of the male unit to the female unit.

12 Claims, 7 Drawing Sheets

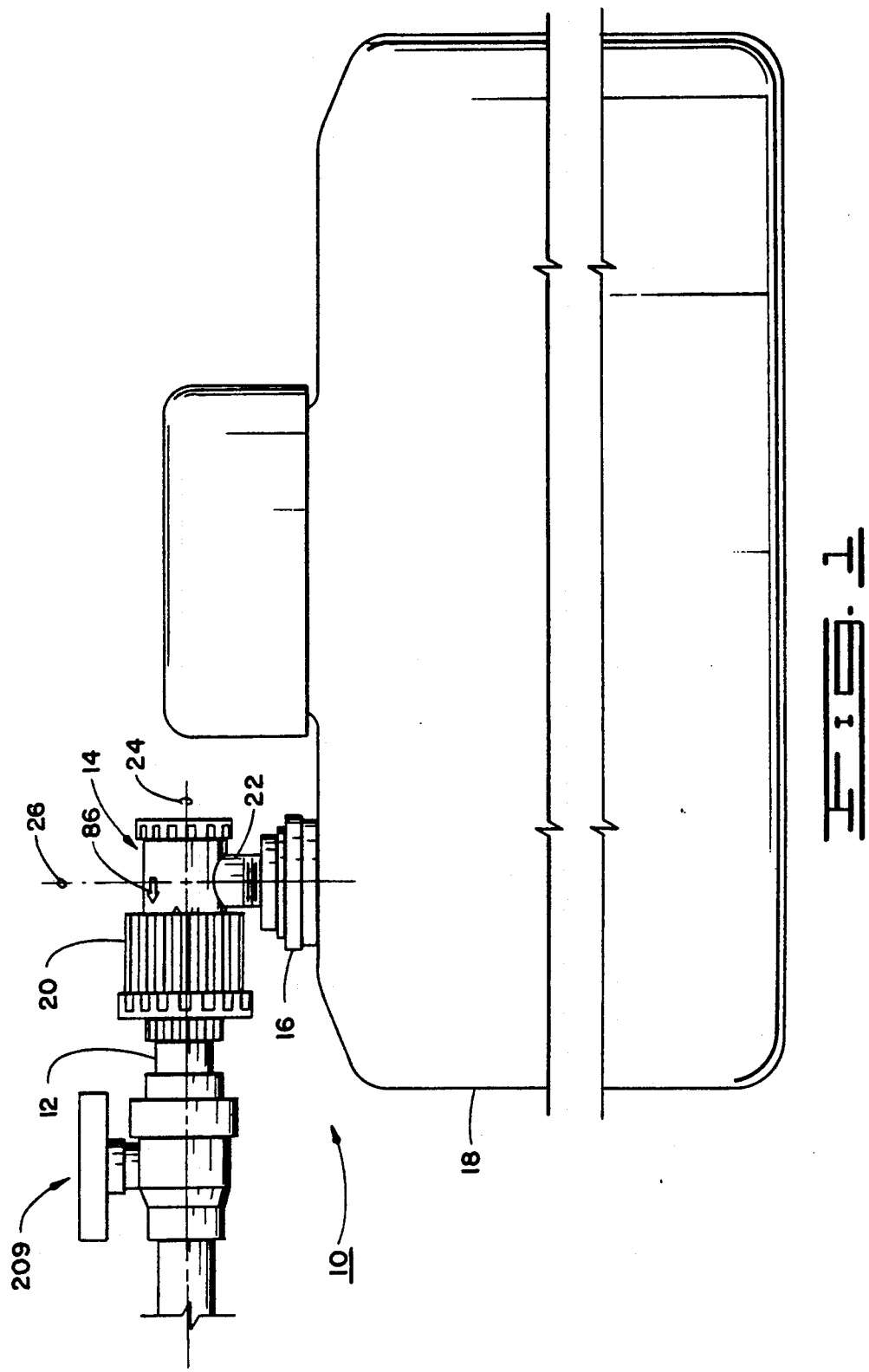

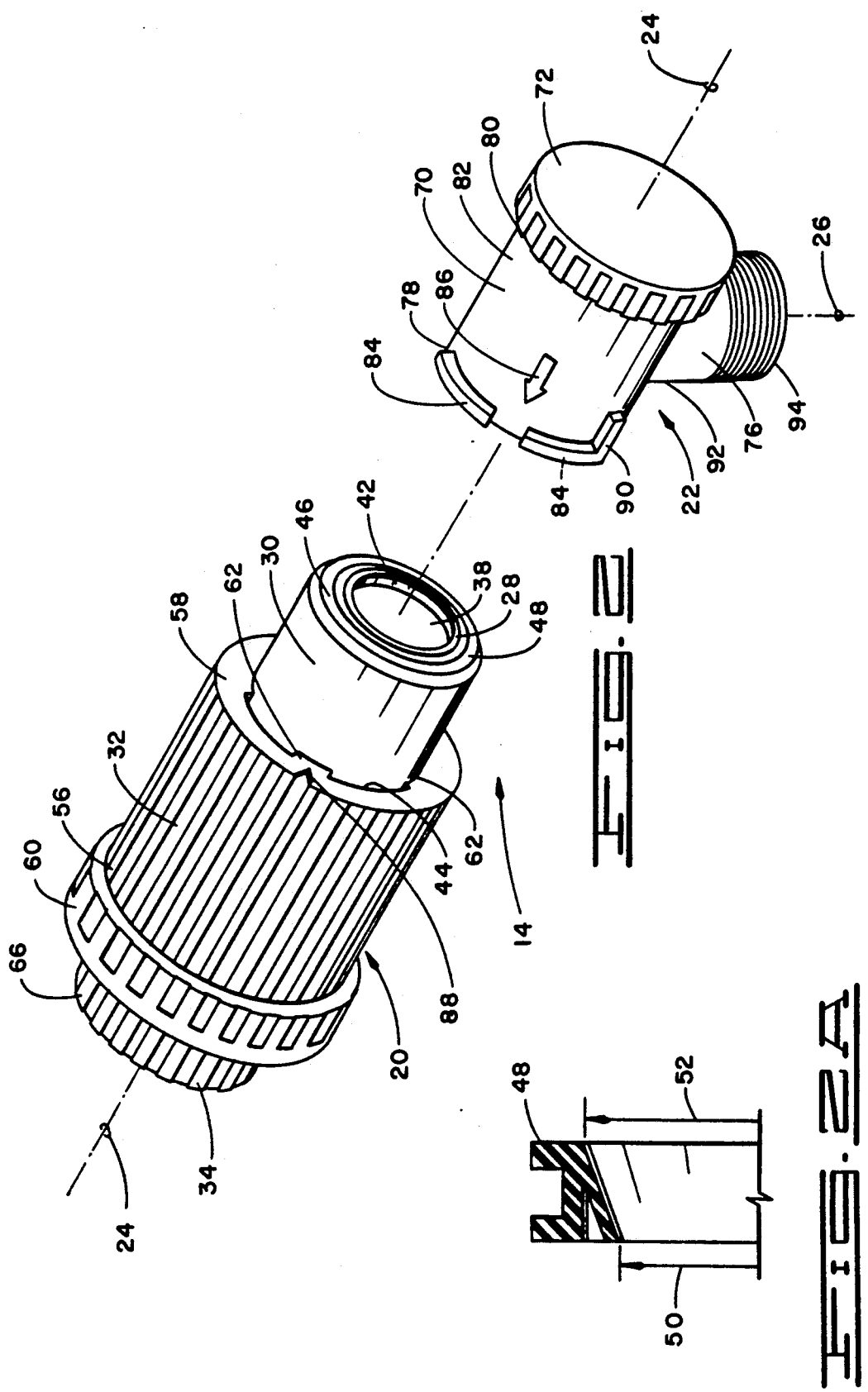

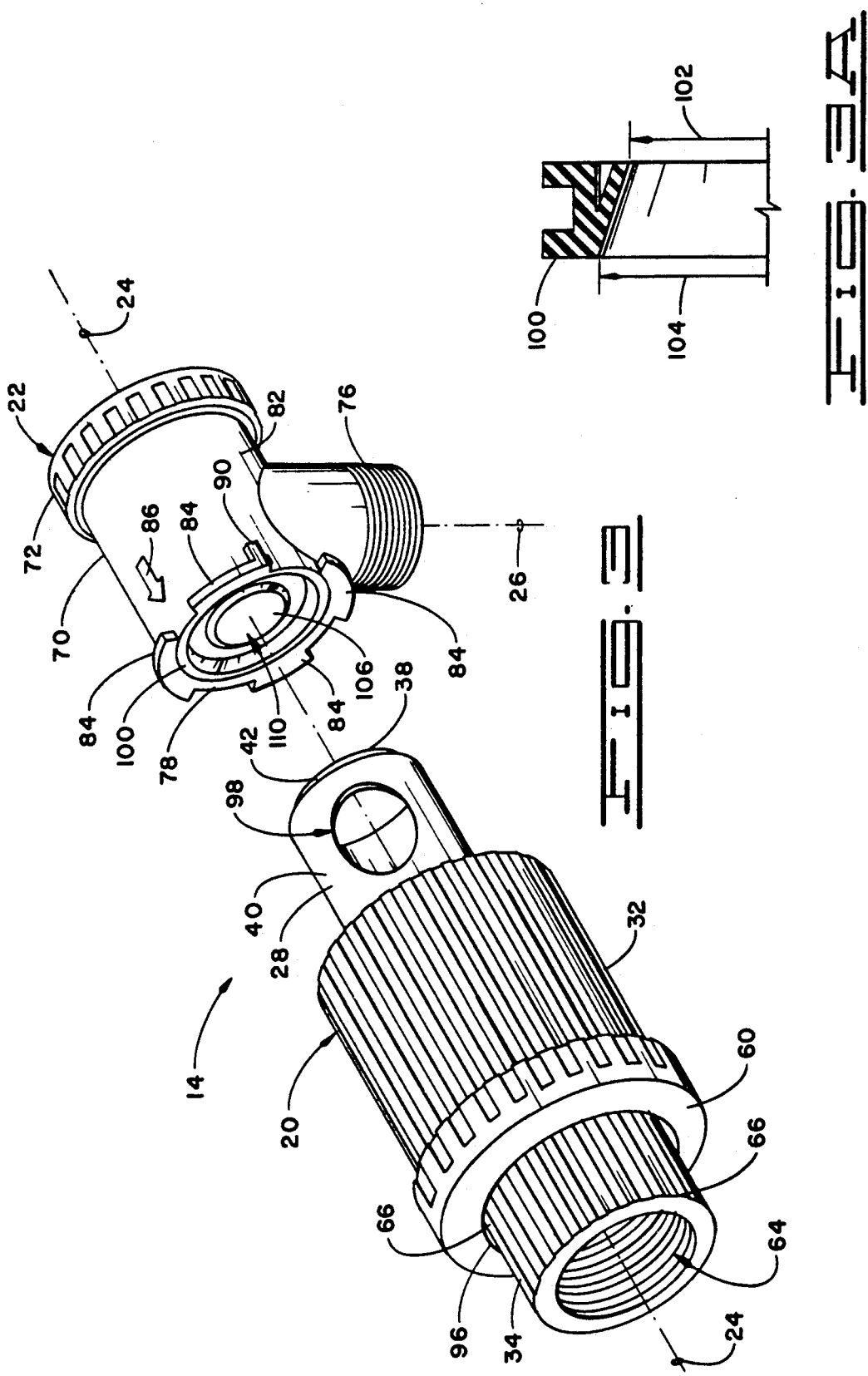

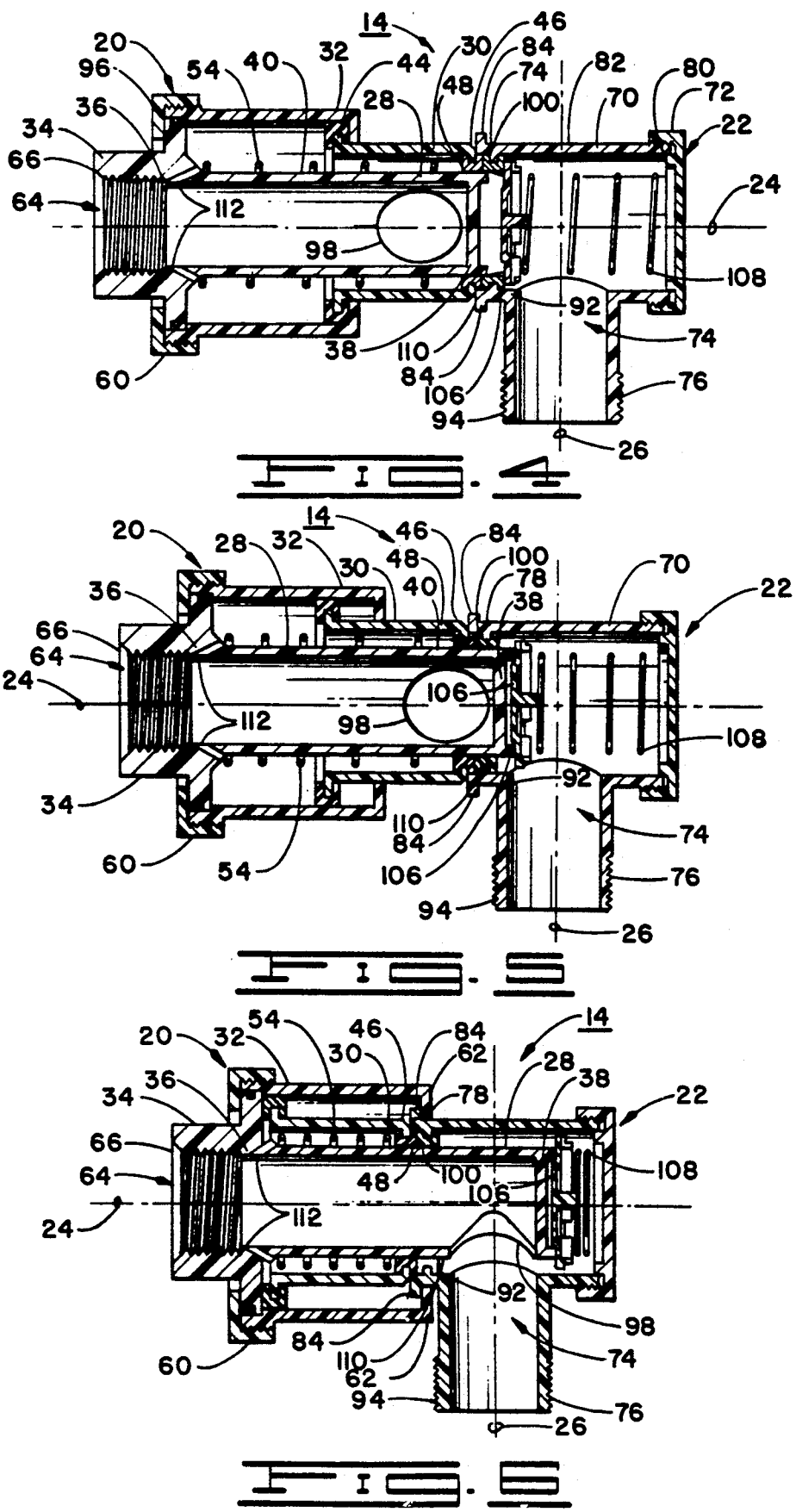

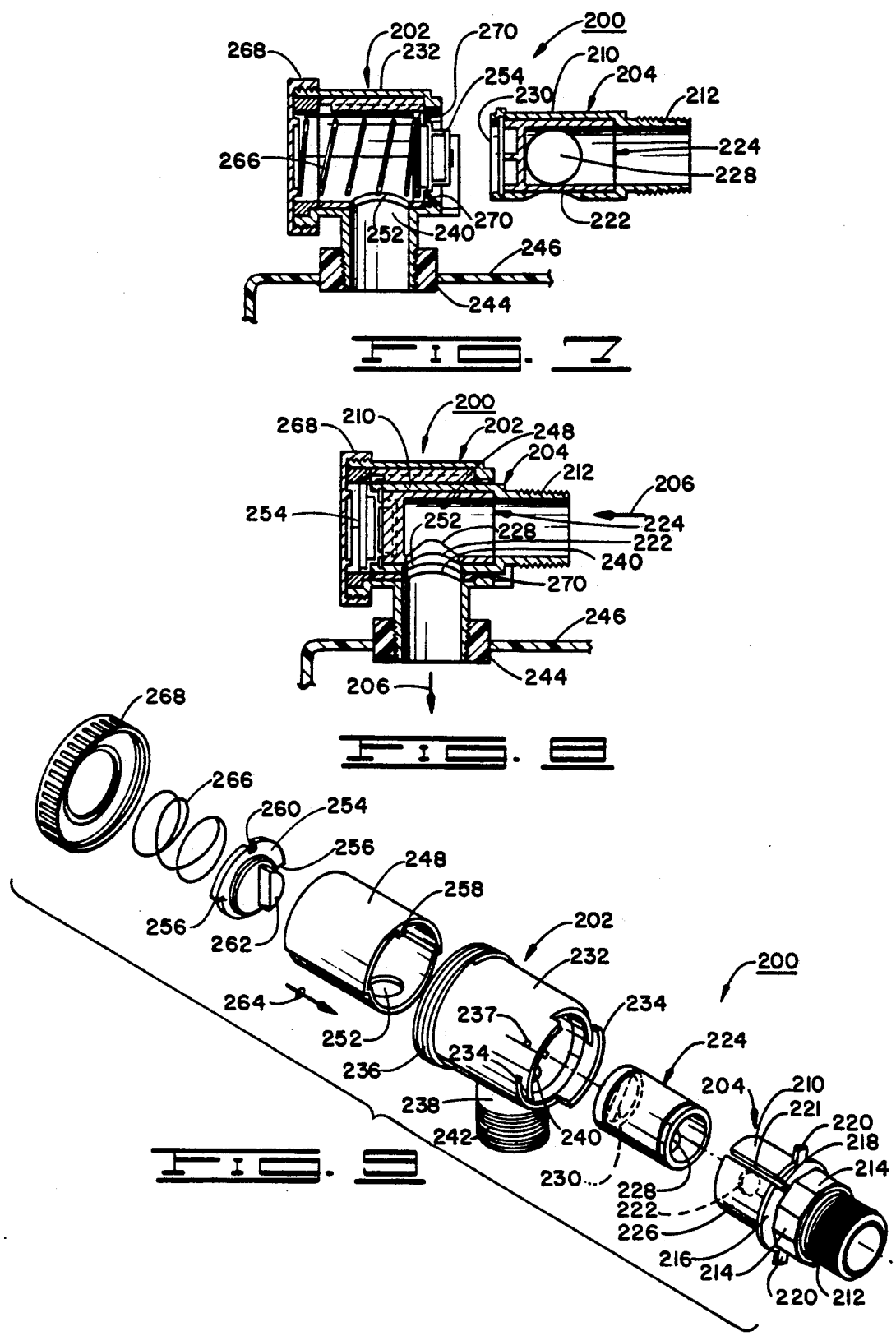

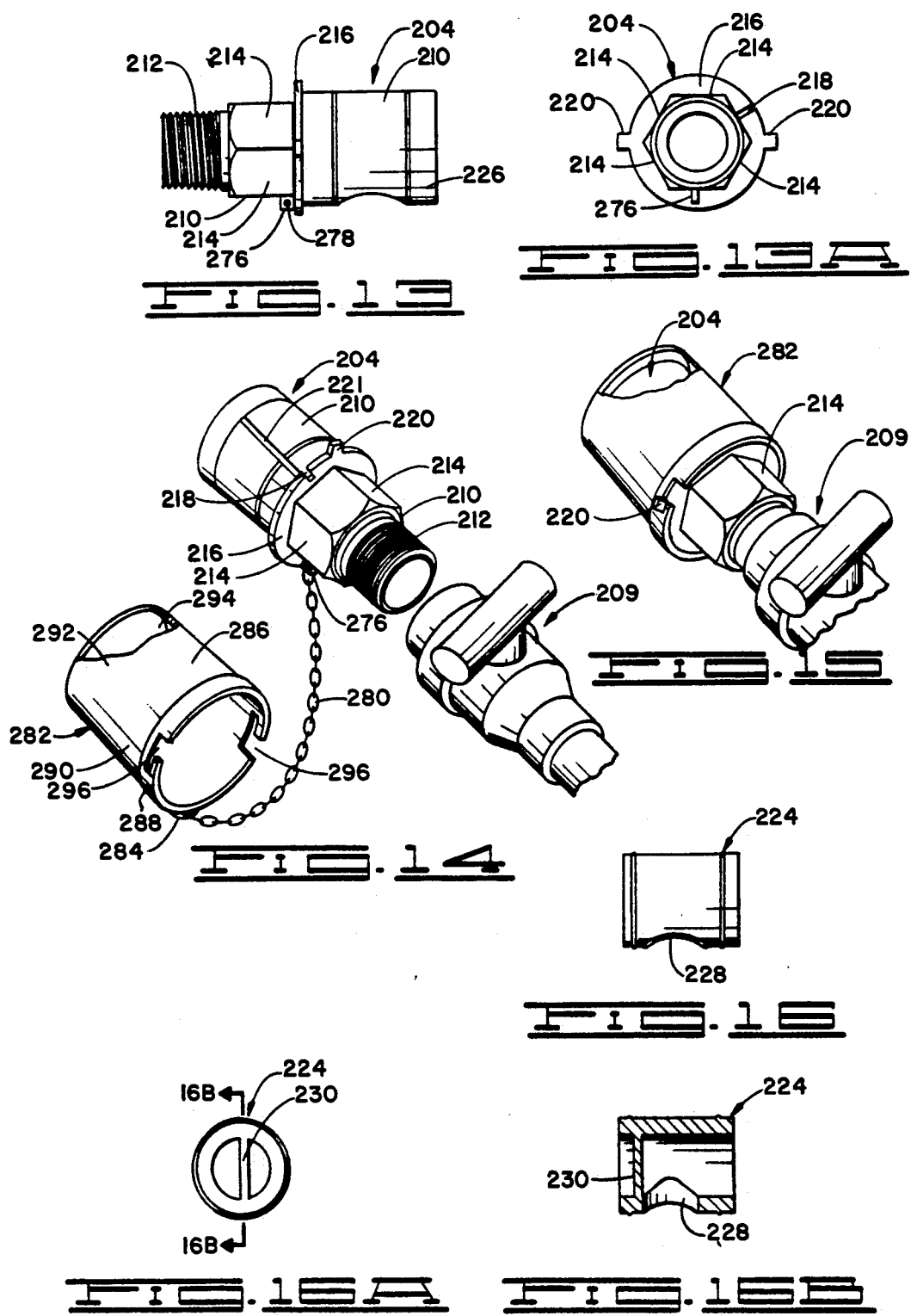

DRIPLESS COUPLING DEVICE

CROSS REFERENCE TO RELATED APPLICATION

This is a continuation-in-part application of my co-pending patent application entitled COUPLING DEVICE, U.S. Ser. No. 367,477, filed June 16, 1989, which is a continuation of my patent application entitled COUPLING DEVICE, U.S. Ser. No. 180,355, filed Apr. 11, 1988, which matured into U.S. Pat. No. 4,844,408.

BACKGROUND OF THE INVENTION

1. Field of the Invention

The present invention relates generally to apparatus for flow conducting devices, and more particularly but not by way of limitation, to a dripless coupling device for quick connection and disconnection of flow conducting members in the use of liquid herbicides and the like.

2. Brief Description of the Related Art

Herbicides play a dominant role in the control of unwanted plant growth in modern agribusiness. Historically, farmers have had unlimited access to herbicides in various kinds of packaging such as small metal cans. Due to environmental considerations, modes of distribution are increasingly regulated and restricted for toxic substances such as herbicides. Farmers must often store a large volume of herbicide in a tank prior to use in order to comply with regulations. The present invention is intended to aid the farmer connect herbicide vessels in a quick fashion with minimal efficiency while assuring substantially dripless fluid transfer.

None of the prior art specifically teaches applications for herbicide dispensing systems. Most of the art, like the present invention, has general application in connecting members which conduct fluid flow. Much of the art was developed in the 1940s in the context of airplane fueling systems.

Main, U.S. Pat. No. 2,457,251 issued Dec. 28, 1948, and Fisher, U.S. Pat. No. 2,254,997 issued Sept. 2, 1941, are two representative patents from that era. A problem that neither patent resolves is port indexing, i.e. the ports of the coupling members are not indexed, therefore the flow axis is obstructed by the internal apparatus of the invention. Also, neither patent effectively addresses the problem of leakage during engagement and disengagement. Finally, the problem of internal fluid pressure buildup due to repeated engagement and disengagement with fluid in the apparatus is not addressed.

French Patent No. 1,120,330 addressed the matter of port indexing but was not concerned with dripless connecting disconnecting as required for herbicide dispensing.

SUMMARY OF THE INVENTION

The present invention provides unobstructed fluid flow within the coupling device by indexing the ports of fluid flow. A male barrel, having a male output port, is inserted into a female barrel which has a female output port. The male barrel and female barrel are coaxially disposed along a first flow axis. The coupling device is designed and constructed so that when the male barrel is fully inserted, the respective ports are indexed, thereby allowing the apparatus to conduct fluid without obstruction.

The present invention prevents fluid leakage, particularly during engagement and disengagement. A seal is mounted on a slide member. Likewise, a seal is mounted on the female barrel member. Fluid which is already in the apparatus is thereby retained during disengagement, and fluid which is outside the apparatus is excluded during engagement.

The present invention prevents fluid pressure buildup within the coupling device. When a coupling device is connected to flow conducting members on either end and becomes primed by repeated engagement and disengagement, fluid pressure can build up in the male unit. This causes subsequent engagement and disengagement of the coupling device to become increasingly difficult. This is solved by a plurality of bleed ports disposed near the upstream end of the male barrel member. Fluid is displaced back into the male barrel member, thereby maintaining at a minimum the force necessary for engagement and disengagement.

An object of the present invention is to provide an improved coupling device for permitting flow conducting members to be quickly connected to and disconnected from a fluid supply source.

Another object of the present invention, while achieving the before-stated objective, is to provide an improved coupling device for connecting members to a fluid supply source which substantially eliminates leakage of fluid therethrough during engagement and disengagement of the coupling device.

Other objects, features and advantages of the present invention will be apparent from the following detailed description when read in conjunction with the drawings and appended claims.

BRIEF DESCRIPTION OF THE DRAWINGS

FIG. 1 is a side elevational view of a herbicide dispensing system. A coupling device is operationally connected to an upstream flow conducting member and to a downstream flow conducting member in conjunction with a herbicide storage tank.

FIG. 2 is an isometric view of disengaged male and female units. FIG. 2A is an enlargement in cross section of a portion of the downstream end of the male unit.

FIG. 3 is another isometric view of the disengaged male and the female units. FIG. 3A is an enlargement in cross section of a portion of the upstream end of the female unit.

FIG. 4 is a cross-sectional view of the male unit and female unit touching but disengaged.

FIG. 5 is a cross-sectional view of the male unit and female unit partially engaged.

FIG. 6 is a cross-sectional view of the male unit and female unit operatively engaged.

FIG. 7 is a cross-sectional view of a dripless coupling device of the present invention wherein a male connecting unit is disengaged from a female connecting unit.

FIG. 8 is a cross-sectional view of the dripless coupling device wherein the male connecting unit is operatively engaging the female connecting unit.

FIG. 9 is an exploded isometric view of the dripless coupling device.

FIG. 13 is a side elevational view of the male connecting unit of the dripless connecting device. FIG. 13A is a front elevational of the male connecting unit.

FIG. 14 is an isometric view of the male connecting unit of the dripless coupling device disconnected from a ball valve.

FIG. 15 is an isometric view of the male connecting unit of the dripless connecting device having the cap secured in a covering position.

FIG. 16 is a side elevational of a male cylinder of the male connecting unit of the dripless coupling device. FIG. 16A is an elevational view of a dial end of the male cylinder. FIG. 16B is a cross-sectional view of the male cylinder along lines 16B—16B of FIG. 16A.

DESCRIPTION

Figures 10, 10A, 10B:
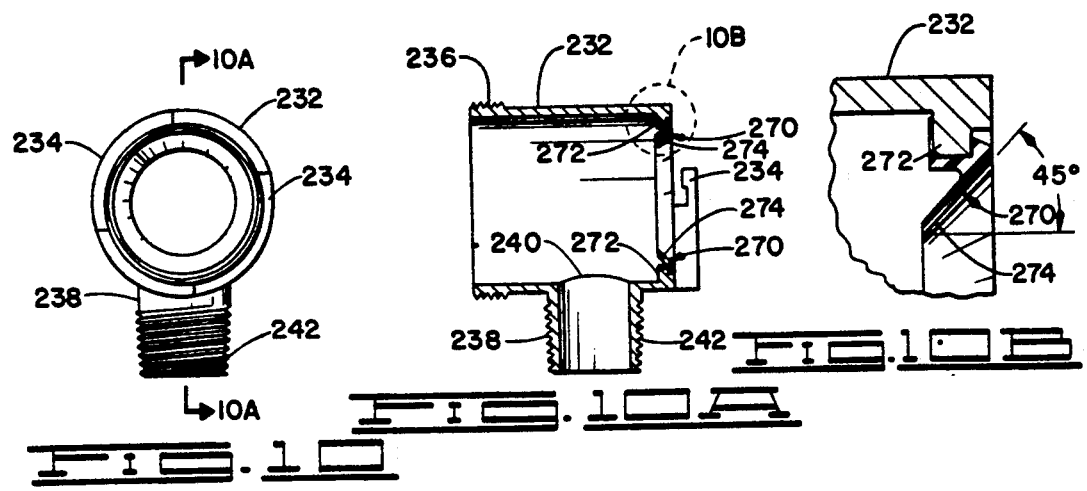
FIG. 10 is a front elevational view of a tee body of the female connecting unit.
FIG. 10A is a cross-sectional view of the tee body along lines 10A—10A of FIG. 10.
FIG. 10B is an enlarged view of a seal of the tee body at the circled area 10B—10B of FIG. 10A.

Many systems which have two or more vessels for fluid storage need modes of transfer between the vessels. Hoses or tubes are commonly used. A common problem is how to connect these flow conducting members quickly and easily for efficient fluid transfer between vessels while substantially eliminating any dripping or spillage.

The present invention solves this problem by allowing flow conducting members to be quickly connected manually with substantially no leakage. Although this system was designed for herbicides, the system will work equally well for most other systems requiring connection of flow conducting members for fluid transfer.

Referring now to the drawings in general, and to FIG. 1 in particular, shown therein and designated by the general reference 10 is an assembly for transferring herbicides. A first flow conducting member 12 is designed for conducting fluids. A coupling device 14, constructed in accordance with the present invention, is connected to the first flow conducting member 12 and to a second flow conducting member 16. The coupling device 14 can be constructed out of any durable, hard material, such as metal or plastic. The second flow conducting member 16 is connected to a storage tank 18 which stores fluid conducted into it via the first flow conducting member 12, the coupling device 14 and the second flow conducting member 16.

The first flow conducting member 12 is upstream from the coupling device 14, and the second flow conducting member 16 and the storage tank 18 are downstream from the coupling device 14. The terms "upstream" and "downstream" as used herein will be for convenience of description. It will be apparent that the coupling device 14 can be used to conduct fluid in either direction, the flow as herein discussed will be assumed to be such that the first flow conducting member 12 is connected to an upstream storage or dispensing vessel upstream thereto but not shown in FIG. 1. The configuration of the coupling device 14 (connected to the first flow conducting member 12 and to the second flow conducting member 16) is for illustrative purposes only, and it will be appreciated that countless other configurations utilizing the coupling device 14 with flow conducting members not shown are possible.

The coupling device 14 is comprised of a male unit 20 and a female unit 22. The male unit 20 extends along a first flow axis 24, while the female unit 22 has associated with it a second flow axis 26. In FIG. 1, the male unit 20 and female unit 22 are operationally engaged, i.e. they are removably attached, so that fluid can be conducted along the first flow axis 24 to the second flow axis 26 through the coupling device 14 without leakage. Generally, when the coupling device 14 is operationally engaged, the first flow axis 24 is horizontal and the second flow axis 26 is vertical.

Referring to FIG. 2, shown therein are the male unit 20 and the female unit 22 in a disengaged state, i.e. not operatively engaged. The male unit 20 and the female unit 22 are addressing each other along the first flow axis 24, and the male unit 20 is upstream from the female unit 22. Several components of the male unit 20 are shown, including a male barrel member 28, a slide member 30, a collar member 32, and a threaded input column 34. Fluid is conducted through the interior of the male barrel member 28 when the coupling device 14 is operatively engaged.

The male barrel member 28 has an upstream end 36 (shown in FIG. 4), a downstream end 38 and an exterior wall 40 (shown in FIG. 3). Preferably, the downstream end 38 of the male barrel member 28 has a frusto-conically shaped lip 42 extending downstream from the plane of the downstream end 38. The downstream end 38 of the male barrel member 28 is impermeable to fluids. Generally, the downstream end 38 of the male barrel member 28 can be designed in any shape which is conducive to reception by the female unit 22.

The male barrel member 28 is telescopically disposed inside the slide member 30 which is exterior to and coaxial with the male barrel member 28. The slide member 30 has an upstream end 44 (shown in FIG. 4) and a downstream end 46. The downstream end 46 of the slide member 30 is frusto-conically shaped and has a first annular seal member 48 mounted thereon. The first annular seal member 48, being telescopically mounted within the frusto-conically shaped downstream end 46 of the slide member 30, telescopically receives the male barrel member 28. The first annular seal member 48 is preferably pliable, impermeable to fluids and extends slightly upstream from the frusto-conically shaped downstream end 46 of the slide member 30 along the first flow axis 24.

At the furthest point upstream that the first annular seal member 48 extends, the first annular seal member 48 has an upstream radius 50 (FIG. 2A) about the first flow axis 24. At the location where the first annular seal member 48 is mounted on the frusto-conically shaped downstream end 46, the first annular seal member 48 has a downstream radius 52 about the first flow axis 24. That is, the first annular seal member 48 gets closer to the first flow axis 24 as it extends upstream so that the upstream radius 50 of the first annular seal member 48 is slightly less than the downstream radius 52. The upstream radius 50 of the first annular seal member 48 is such that the exterior wall 40 of the male barrel member 28 abuts and is sealed by the first annular seal member 48 so that fluid can not flow upstream past the first annular seal member 48 along the exterior wall 40 of the male barrel member 28.

The length of the slide member 30 (along the first flow axis 24) is approximately half that of the length of the male barrel member 28. The slide member 30 slides along the first flow axis 24 relative to the male barrel member 28. The maximum downstream position of the slide member 30 relative to the male barrel member 28 is an extended position. In the extended position, the downstream end 46 of the slide member 30 is at the same position along the first flow axis 24 as the downstream end 38 of the male barrel member 28. In FIG. 2, the slide member 30 is depicted in the extended position. It is biased towards the extended position by a biasing or slide spring 54 (shown in FIG. 4) which is disposed about a portion of the male barrel member 28.

Still referring to FIGS. 2 and 4, the collar member 32 is coaxial with, and exterior to, both the male barrel member 28 and the slide member 30. The collar member 32, which has an upstream end 56 and a downstream end 58, is immobile relative to the male barrel member 28. The upstream end 56 of the collar member 32 is at the same location along the first flow axis 24 as the upstream end 36 of the male barrel member 28 (FIG. 4). The upstream end 56 of the collar member 32 is threaded, and mounted exterior thereto and coaxial therewith is a removable threaded first cap 60. The first cap 60 is impermeable to fluids and, when screwed onto the upstream end 56 of the collar member 32, assures that no fluid between the exterior wall 40 of the male barrel member 28 and the collar member 32 will be lost. When the first cap 60 is removed from the upstream end 56 of the collar member 32, the male unit 20 can be disassembled by sliding the collar member 32 downstream relative to the male barrel member 28.

On the downstream end 58 of the collar member 32 is disposed a plurality of collar dog members 62 which extend inwardly toward the first flow axis 24 to define a concentric ring thereabout. The collar dog members 62 telescopically receive the slide member 30 and serve to guide the slide member 30 as it moves relative to the male barrel member 28 to keep the components of the male unit 20 coaxial. In the extended position of the slide member 30, the collar dog members 62 abut the upstream end 44 of the slide member 30 and prevent the slide member 30 from going further downstream relative to the male barrel member 28.

The threaded input column 34 is attached to the upstream end 36 of the male barrel member 28 to provide a male input port 64 (FIG. 4). The threaded input column 34 has an upstream end 66 and is coaxial with the male barrel member 28, the slide member 30, the collar member 32, and the male input port 64 (FIG. 4). The threaded input column 34 receives the first (upstream) flow conducting member 12 (FIG. 1) for the purpose of interconnecting the coupling device 14 with a fluid vessel. The threaded input column 34 via the male input port 64 (FIG. 4) guides fluid into the male barrel member 28 where it can be further conducted upstream when the coupling device 14 is operatively engaged. Likewise, when the flow direction is reversed, the threaded input column 34 guides fluid out of the male barrel member 28.

The female unit 22 is directly downstream from and coaxial with the male unit 20. The female unit 22 is comprised of components including a female barrel member 70, a threaded removable second cap 72, a female output port 74 (FIG. 4), and a threaded output column 76. The female barrel member 70 has an upstream end 78, a downstream end 80 and an exterior wall 82. The upstream end 78 of the female barrel member 70 is open faced.

Disposed along the exterior wall 82 at the upstream end 78 of the female barrel member 70 is a plurality of female barrel dogs 84. For ease of engagement, a female arrow 86 is formed in the exterior wall 82 of the female barrel member 70, and a male arrow 88 is formed on the downstream end 58 of the collar member 32. When the female arrow 86 is aligned with the male arrow 88, the female barrel dogs 84 are disposed such that, when adjacent the collar dog members 62, the female barrel dogs 84 will mesh with the collar dogs 62 to permit penetration of the female barrel member 70 into the interior of the collar member 32.

On one of the female barrel dogs 84 is affixed a tab 90. When the female barrel dogs 84 penetrate into the interior of the collar member 32 and the male unit 20 is manually rotated relative to the female unit 22 along the first flow axis 24, the tab 90 will abut one of the collar dog members 62 of the collar member 32 to prevent further relative rotation in that direction.

In FIG. 2, the female barrel member 70 is shown coaxial with the male barrel member 28, the slide member 30, the collar member 32 and the threaded input column 34. The downstream end 80 of the female barrel member 70 (FIG. 4) is open faced and threaded to receive the threaded second cap 72. The second cap 72 is screwed onto the downstream end 80 of the female barrel member 70 and, being impermeable to fluids, prevents escape of fluids therethrough.

Along the bottom of the female barrel member 70 is the female output port 74 (shown in FIGS. 4–6). The female output port 74 is an open space in the female barrel member 70. The female output port 74 is the site where fluid is conducted from the first flow axis 24 to the second flow axis 26 or vice versa. The female barrel member 70 is affixed to the threaded output column 76 at the female output port 74 (shown in FIGS. 4–6). The output column 76 has an upstream end 92 and a downstream end 94. The output column 76 is affixed to the female barrel member 70 at the upstream end 92. The downstream end 94 of the output column 76 is threaded to connect to the second (downstream) flow conducting member 16 and storage tank 18 (see FIG. 1).

Attention is now directed to FIG. 3 where another isometric view of the male unit 20 and the female unit 22 is depicted. As in FIG. 2, the male unit 20 and female unit 22 are in a disengaged state and again are addressing each other along the first flow axis 24.

A portion of a male barrel flange 96 is visible between the threaded first cap 60 and the upstream end 66 of the input column 34. The slide member 30 is in its retracted position and so is hidden by the collar member 32, thereby exposing a male output port 98 in the male barrel member 28. It should be noted that the slide member 30 would not normally be in the retracted position of FIG. 3 without an upstream directed force on its downstream end 46, but the slide member 30 is depicted in the retracted position to provide a view of the male output port 98. The male output port 98, an opening in the male barrel member 28, is selectively disposed so as to be indexed with the female output port 74 of the female unit 22 when the coupling device 14 is operationally engaged.

The upstream end 78 of the female barrel member 70, as shown in FIG. 3, has an inverse frusto-conical shape and is designed to abut the frusto-conically shaped downstream end 46 of the slide member 30 to push the slide member 30 upstream relative to the male barrel member 28 as the male and female units 20, 22 are brought together. The four female barrel dogs 84 at the periphery of the upstream end 78 of the female barrel member 70 are shown in the view provided by FIG. 3.

A second annular seal member 100, preferably pliable and fluid impermeable, is mounted on the upstream end 78 of the female barrel member 70 to extend slightly downstream along the first flow axis 24. At the furthest point downstream that the second annular seal member 100 extends, the second annular seal member 100 has a downstream radius 102 about the first flow axis 24 (FIG. 3A). At the location where the second annular seal member 100 is mounted on the upstream end 78 of the female barrel member 70, the second annular seal member 100 has an upstream radius 104 about the first flow axis 24. The downstream radius 102 of the second annular seal member 100 is less than the upstream radius 104 of the second annular seal member 100. Thus, the second annular seal member 100 gets closer to the first flow axis 24 as it extends downstream so that it retains any fluid moving upstream. A saucer shaped plunger member 106 is disposed inside the barrel member 70 and is biased by a plunger spring 108 (FIG. 4) to seal the open upstream end 78 thereof which forms a female input port 110. As the upstream end 78 of the female barrel member 70 abuts the plunger member 106, the downstream end of the second annular seal member 100 seals about the plunger member 106. The plunger member 106, movable relative to the female barrel member 70 along the first flow axis 24, has an extended position and a retracted position. At the extended position, the plunger member 106 abuts the upstream end 78 of the female barrel member 70. At the retracted position, the plunger member 106 and the spring 108 are compressed against the second threaded cap 72. At the extended position, the second annular seal member 100 seals against the plunger member 106 so that fluid cannot enter or exit the female input port 110 of the female barrel member 70.

Referring to FIG. 4, the male unit 20 and female unit 22 are shown in cross section in a disengaged state, addressing each other along the first flow axis 24. The downstream end 46 of the slide member 30 abuts the upstream end 78 of the female barrel member 70. The downstream end 38 of the male barrel member 28 does not abut the plunger member 106.

Both the slide member 30 and the plunger member 106 are in their respective extended positions. The slide spring 54 is disposed between the downstream end 46 of the slide member 30 and the male barrel flange 96. The plunger spring 108 is disposed between the plunger member 106 and the second removable threaded cap 72.

The male output port 98 is open to the interior of the slide member 30 so any fluid entering via the male input port 64 can travel downstream along the interior of the male barrel member 28 and can then wash into the respective interiors of the slide member 30 and the collar member 32, via the male output port 98. The interior of the slide member 30 and the interior of the collar member 32 openly communicate.

Fluid and pressure buildup are alleviated by a plurality of bleed ports 112, disposed near the male input port 64 to create a channel between the interior of the collar member 32 and the male output port 98. Preferably there are four bleed ports 112 placed equidistantly around the periphery of the upstream end 36 of the male barrel member 28.

Referring to FIG. 5, the male unit 20 and female unit 22 are shown in a partially engaged state, i.e., the male barrel member 28 has penetrated into the female barrel member 70 but the downstream end 38 of the male barrel member 28 has not yet reached its maximum downstream position relative to the female output port 74 so the coupling device 14 is not yet operationally engaged. The male barrel member 28 has entered the female barrel member 70 via the female input port 110. The downstream end 38 of the male barrel member 28 abuts the plunger member 106 and pushes it downstream as the male barrel member 28 advances, thereby also compressing the plunger spring 108. The exterior wall 40 of the male barrel member 28 is sealed by the second annular seal member 100 as the male barrel member 28 advances through the female input port 110.

The upstream end 78 of the female barrel member 70 continues to abut the downstream end 46 of the slide member 30. The slide member 30 is therefore moved upstream relative to the male barrel member 28 and prevented from entering the female barrel member 70. The slide spring 54 is compressed by this relative movement. If there is fluid or pressure buildup in the interior of the slide member 30 or the interior of the collar member 32, the bleed ports 112 serve to alleviate that buildup by allowing the fluid or pressure to escape back to the male input port 64.

Referring to FIG. 6, the coupling device 14 is shown in the operationally engaged state. The downstream end 38 of the male barrel member 28 has reached its maximum downstream position relative to the female output port 74. At this position, the male unit 20 has been rotated about the first flow axis 24 relative to the female unit 22. The female barrel dogs 84 have meshed with and then moved immediately upstream from the collar dog members 62 so that the female barrel dogs 84 have penetrated into the interior of the collar member 32. At the point where the male output port 98 indexes with the female output port 74, further rotation in the direction of rotational engagement is not possible because the tab 90 (FIG. 3) abuts the first collar dog member 62 it encounters.

The slide spring 54 and the plunger spring 108 are both maximally compressed and the coupling device 14 is locked in the operationally engaged state by the respective compression forces which are colinear and oppositional. Fluid cannot enter the coupling device 14 where the upstream end 78 of the female barrel member 70 abuts the downstream end 46 of the slide member 30, and the male barrel member 28 is sealingly engaged by the first annular seal member 48 and the second annular seal member 100.

In the operationally engaged state, there is an open, unobstructed channel for fluid flow starting at the upstream end 66 of the input column 34 and moving downstream through the male input port 64, the length of the male barrel member 28, through the male output port 98, the female output port 74 and finally down the output column 76. Thus, when the input column 34 is connected to the first flow conducting member 12 and the output column 76 is connected to the second flow conducting member 16 (FIG. 1), fluid can be conducted from one vessel to another via the operationally engaged coupling device 14.

A dripless coupling device 200, also constructed in accordance with the present invention, is shown in various engaged and disengaged positions with its components in FIGS. 7 through 16.

The coupling device 200 comprises a female connecting unit 202 (also referred to as a first flow conducting unit) and a male connecting unit 204 (also referred to as a second flow conducting member). Fluid flow through the assembled coupling device 200 is indicated by fluid flow arrows 206 in FIG. 8 as fluid is pumped from a storage tank (not shown) through a fluid supply hose 208 connected to the male connecting unit 204 via a ball valve 209 (FIGS. 1 and 14).

The male connecting unit 204 comprises a male barrel 210 which has a male threaded end 212 having several flats 214 disposed thereabout for the purpose of wrench tightening. The male barrel 210 has a collar 216 which has a single collar notch 218, as shown, and a pair of male tab members 220 extending from opposite sides of the collar 216. A pin groove 221, the function of which will be described in more detail hereinafter, extends the length of the male barrel 210 along the outer surface thereof so as to be aligned with the collar notch 218. Further, the male barrel 210 has a male barrel port 222 shown in FIG. 9 in phantom lines. The collar 216 (and thus the male tab members 220) which are utilized to connect the male barrel 210 of the male connecting unit 204 to the female connecting unit 202, extend from the male barrel 210 so as to be disposed at a position between the threaded end 212 and the male barrel port 222.

The male connecting unit 204 also comprises a male cylinder 224 (FIGS. 7 and 9) which is disposed within a shuttle end 226 of the male barrel 210. The male cylinder 224 is preferably made of a relatively smooth and low friction material such as Teflon ® (a trademark of E. I. Dupont Company), capable of the corrosive service demands of herbicide chemicals. The male cylinder 224, described further hereinbelow, has a cylinder bore 228 extending through one sidewall thereof and a dial end 230 which serves to rotate the male cylinder 224 within the male barrel 210 to control the registering position of the cylinder bore 228.

The female connecting unit 202 includes a female tee body 232 having locking tabs 234 at one end, external cap threads 236 at an opposite end thereof and a locking pin 237. The locking tabs 234 of the female tee body 232 are adapted to lockingly engage the male tube members 220 of the male barrel 210 when the male barrel 210 is positioned within the female tee body 232. The locking pin 237 extends inwardly into the female tee body 232 so as to be slidably movable along the pin groove 221 formed in the exterior surface of the male barrel 210 of the male connecting unit 204 during interconnection of the female connecting unit 202 with the male connecting unit 204.

A hollow tee post 238 extends from the female tee body 232 and communicates with a female tee port 240 therein. The tee post 238 has an externally threaded end 242, as shown, for securing the female connecting unit 202 to a tank bung 244 of a liquid storage and mixing tank 246 (FIGS. 7 and 8).

The female connecting unit 202 further includes a dial retainer liner 248 which is received inside the female tee body 232. The dial retainer liner 248 is shaped to have a pair of interior supporting shelves 250 extending the length thereof; and the dial retainer liner 248 has a liner port 252 which is substantially equal in diameter to the female tee port 240 of the female tee body 232. The dial retainer liner 248 is dimensioned so that, once pressed into the female tee body 232, it lines the interior thereof with the liner port 252 of the dial retainer liner 248 indexed with the female tee port 240. The dial retainer liner 248 can be staked permanently therein by a pin or the like (not shown). The dial retainer liner 248 is preferably made of a relatively smooth material, such as Teflon ® (a trademark of E. I. Dupont Company) or a similar material.

A dialer member 254 is provided having an external configuration so as to be slidably retained within the interior of the dial retainer liner 248. The lower half of the dialer member 254, like that of the dial retainer liner 248, is of decreased diameter to that of the upper half thereof so that a pair of supporting tabs 256 are formed which are slidably disposed along the supporting shelves 250 of the dial retainer liner 248. The dial retainer liner 248 has a guide tab 258 extending along the top of its interior surface, and the dial member 254 has a top center guiding groove 260 dimensioned to slidably receive the guide tab 258 therein. Further, the dialer member 254 has a protruding key member 262 extensive therefrom, the purpose of which will be discussed below.

The dialer member 254 is slidably supported in the dial retainer liner 248 and biased in a direction 264 by a spring 266 maintained in the female tee body 232 via a threaded cap 268 mounted on the external cap threads 236. A seal 270, described further hereinbelow, is mounted internal to the locking tabs 234 and serves to seal against the supporting tabs 256 and the dialer member 254 to protect the female connecting unit 202 from foreign material intrusion when the male connecting unit 204 is disengaged therefrom.

Turning now to FIGS. 10–16B certain components of the coupling device 200 are depicted in more detail. FIG. 10 shows a front elevational view of the female tee body 232, while FIG. 10A depicts a side cross-sectional view thereof. FIG. 10B shows an enlargement of the seal 270 which is configured to be mounted over a stop ring 272 which extends from the interior surface of the female tee body 232, the stop ring 272 serving as a forward stop to the dialer member 254. The seal 270 is preferably made of a polymeric or elastomeric material determined by the service requirements of the coupling device 200, and the seal 270 is provided with an angularly disposed flap portion 274 for abuttingly engaging the dialer member 254 and protecting the female connecting unit 200 from dust and the like when the male connector unit 204 is disconnected therefrom.

Figures 11, 11A:
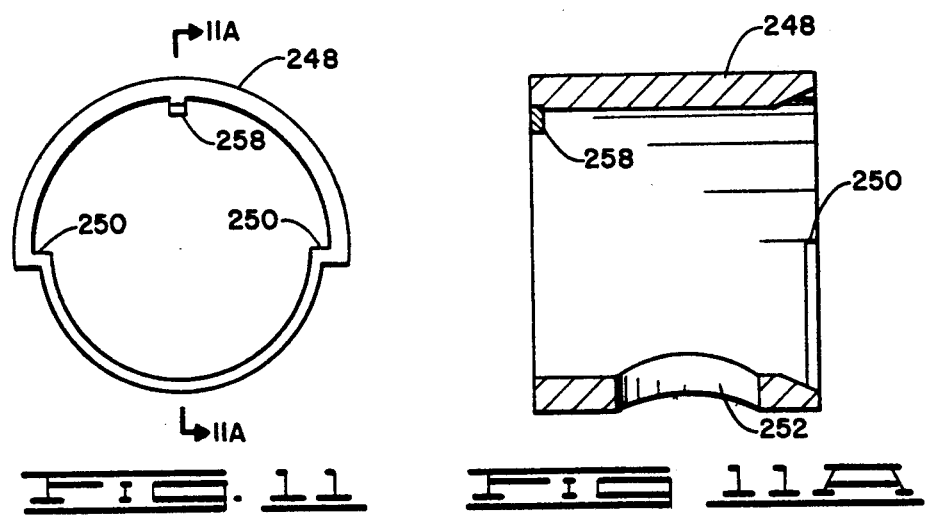
FIG. 11 is a front elevational view of a dial retaining liner of the dripless coupling device.
FIG. 11A is a cross-sectional view of the dial retaining lines along lines 11A—11A of FIG. 11.

FIG. 11 shows a front elevational view of the dial retainer liner 248 depicting the supporting shelves 250 and the guide tab 258; while FIG. 11A depicts a side cross-sectional view of the dial retainer liner 248 to more clearly illustrate the liner port 252 thereof.

Figures 12, 12A:
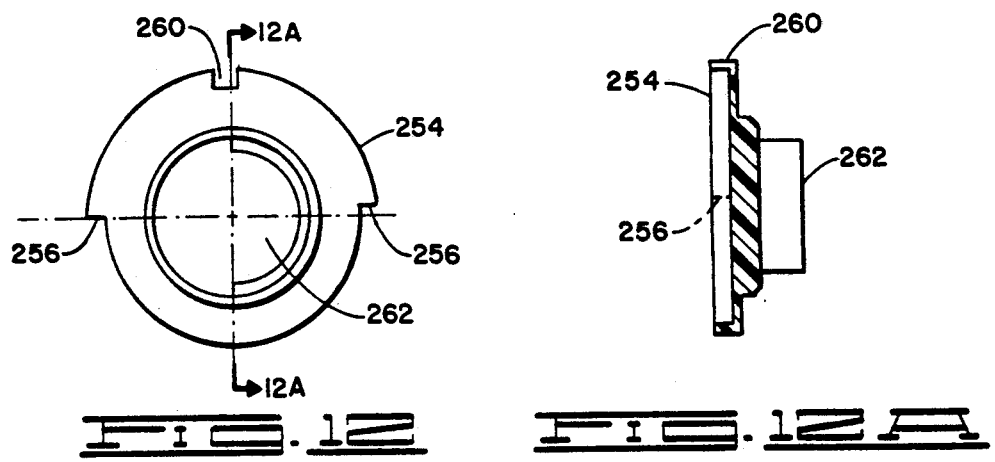
FIG. 12 is a front elevational view of a dialer member positionable within the dial retaining liner of the dripless coupling device.
FIG. 12A is a cross-sectional view of the dialer member along lines 12A—12A of FIG. 12.

FIG. 12 shows a front elevational view of the dialer member 254 depicting the supporting tabs 256 and the guiding groove 260 thereof to facilitate the positioning of the dialer member 254 in the dial retainer liner 248 (FIGS. 11 and 11A). FIG. 12A is a cross-sectional view of the dialer member 254 of FIG. 12 along lines 12A-12A to illustrate the key member 262 thereof. The key member 262 is positionable within an opening or key hole formed in the dial end 230 of the male cylinder 224 so that the male cylinder 224 can be selectively rotated in response to the rotating of the dialer member 254 and the cylinder bore 228 of the male cylinder 228 brought into registry with the male barrel port 222.

FIG. 13 shows a side elevational view of the male connecting unit 204 of the dripless connecting device 200 while FIG. 13A depicts a front elevational view thereof. The male connecting unit 204 is provided with a tab 276 having an aperture 278 adapted to receive one end of a chain member 280 so that the other end of the chain member 280 can be connected to a closure cap 282 (FIG. 14). The tab members 220 and the collar notch 218 of the male connecting unit 204 are clearly depicted in FIG. 13A. FIG. 14 shows an isomeric view of the male connecting unit 204 of the dripless coupling device 200 disconnected from the ball valve 209 and further illustrating the attachment of the closure cap 282 to the male connecting unit 204 via the chain member 280. The closure cap 282 is provided with a tab 284 having an aperture (not shown) therein so that one end of the chain member 280 can be connected to the closure cap 282 via the tab 284.

The closure cap 282 comprises a substantially cylindrical shaped body portion 286 having a collar 288 formed at one end 290 thereof, an opposed end 292 of the cylindrical shaped body portion 286 being closed so as to define a cavity 294 therein. The collar 288 is provided with oppositely disposed key slots 296 adapted to receive the tab members 220 of the male barrel 210 such that the closure cap 282 can be secured on the male barrel 210 and thereby prevent foreign material from entering the male connecting unit 204 when same is disconnected from the female connecting unit 202. That is, when the closure cap 282 is disposed over the male barrel 210, so that the tab members 220 are positioned within the key slots 296 formed in the collar 288 of the closure cap 282, and the closure cap 282 is rotated in a clockwise direction, the tab members 220 are selectively locked in the key slots 296. Thus, the closure cap 282 is secured on the male barrel 210 substantially as shown in FIG. 15; and the closure cap 282 prevents particulate matter from entering the male connecting unit 204.

FIGS. 16-16B show the male cylinder 224 of the male connecting unit 204. That is, FIG. 16 is a side elevational view of the male cylinder 224 whereas FIG. 16A is an elevational view of the dial end 230 of the male cylinder 224 and FIG. 16B is a cross-sectional view of the male cylinder 224 to more clearly illustrate the the male barrel port 222. The dial end 230 is configured to receive the key member 262 of the dialer member 254 when the female connecting unit 202 and the male connecting unit 204 are connected.

In the operational state of the coupling device 200 (the female connecting unit 202 is operably connected to the male connecting unit 204), fluid flow is provided therethrough as indicated by the fluid flow arrows 206 (FIG. 8) through the coupling device 200 and into the tank 246. Thus, fluid can be conducted from one vessel to another via the operational dripless coupling device 200.

To place the coupling device 200 in its operational state, the closure cap 282 is removed from the male connecting unit 204 and the male barrel 210 is inserted into the female tee body 232 so that the dialer member 254 is slidingly retained within the interior of the dial retaining liner 248. The locking pin 237 (FIG. 9) extends inwardly into the female tee body 232 so as to be disposed within a pin groove 221 formed along the outer surface of the male barrel 210. The pin groove 221 extends the length of the male barrel 210 and is aligned with the collar notch 218 formed in the collar 216 of the male barrel 210.

As the male connecting unit 204 is urged into the female connecting unit 202, the locking pin 237 is caused to ride in the pin groove 221 and the dialer member 254 and spring 266 are compressed. It should be noted that the positioning of the locking pin 237 in the pin groove 221 prevents the male connecting unit 204 from being turned or rotated relative to the female connecting unit 202 until such time as the locking pin 237 clears the collar notch 218 in the collar 216 of the male barrel 210.

When the male connecting unit 204 has been completely inserted into the female connecting unit 202, that is, the locking pin 237 has passed through the pin groove 221 and the collar notch 218, the male barrel 210 is rotated clockwise such that the tab members 220 lockingly engaged the locking tabs 234 of the female tee body 232. During the rotation of the male connecting unit 204 the key member 262 stabilizes the male cylinder 224. When the male connecting unit is operably connected to the female connecting unit 202 the male barrel port 222 is aligned with and registers with the female tee port 240 thereby permitting unrestricted fluid flow through the coupling device 200.

When the fluid pumping cycle is completed the male connecting unit 204 (and thus male barrel 210) is rotated counter clockwise approximately 90° so that the cylinder bore 228 thereof is moved to a closed position. Once the male barrel 210 has been rotated to the closed position the male connecting unit 204 can be removed from the female connecting unit 202 and the closure cap 282 secured over the male barrel 210 substantially as shown in FIG. 15.

From the above description it becomes apparent that the improved dripless coupling device 200 constructed in accordance with the present invention overcomes many of the deficiencies inherent in the prior art devices. Further, it is clear that the present invention is well adapted to carry out the objects and attain the advantages mentioned as well as those inherent therein. While the presently preferred embodiment of the invention has been described for purposes of this disclosure, numerous changes can be made which will readily suggest themselves to those skilled in the art and which are encompassed within the spirit of the invention disclosed and as defined by the appended claims.

What is claimed is:

1. A dripless coupling device for quick connection and disconnection of a flow conducting members comprising:

a male barrel having a threaded end, a shuttle end and a male barrel port disposed therebetween;

a collar member supported by the male barrel so as to be disposed between the threaded end and the male barrel port thereof, the collar member having a plurality of male tab members extending therefrom;

a male cylinder having a cylinder bore extending through one side thereof and a dial end, the male cylinder disposable within the male member such that the cylinder bore can be selectively moved for registery with the male barrel port;

a female body having a hollow post communicating with a female port formed in one side of the female body, the female body having locking tabs formed on one end thereof and an externally threaded end, the locking tabs adapted to lockingly engage the male tab members on the collar member when the male barrel is positioned within the female body such that in a locked position the male barrel port is in registery with the female port;

a dial retainer liner having a liner port extending through one side thereof, the dial retainer liner positionable within the female body such that the liner port is in registery with the female port of the female body;

a dialer member positionable within the dial retainer liner, the dialer member adapted to selectively rotate the male cylinder when the male cylinder and barrel member are disposed within the female body and secured therein via interconnection of the male tab members and the locking tabs so that the cylinder bore of the male cylinder can be brought into registery with the female port;

seal means supported by the female body for sealingly engaging the dialer member when the barrel member and male cylinder are disconnected from the female body; and means to form a fluid-tight seal between the seal means and the dialer member while permitting the dialer member to be retracted upon insertion of the male cylinder and the male barrel into the female body.

2. The dripless coupling device of claim 1 further comprising means for guiding the male barrel into the female body such that upon engaging the male tab members with the locking tabs, the male barrel port is brought into registery with the female port.

3. The dripless coupling device of claim 2 wherein the male barrel is provided with a groove extending longitudinally along its outer surface, the collar member is provided with a notch which is aligned with the groove, and wherein the means for guiding the male barrel into the female body comprises a pin member supported by the female body so as to be disposed substantially adjacent the locking tabs, the pin member extending inwardly into the female body and adapted to slidingly engage the groove for movement therethrough and through the notch.

4. The dripless coupling device of claim 1 further comprising means for aligning and supporting the dialer member in the dial retainer liner.

5. The dripless coupling device of claim 1 wherein the dial retainer liner further comprises:
 a guiding tab extending longitudinally an interior surface of the dial retainer liner; and
 spatially disposed interior supporting sleeves formed along the interior surface of the dial retainer liner.

6. The dripless coupling device of claim 5 wherein the dialer member is provided with a guiding groove formed in an exterior surface thereof, the guiding tab of the dial retainer liner positionable within the guiding groove for permitting sliding movement of the dialer member within the dial retainer liner, and wherein the dialer member comprises a pair of oppositely disposed supporting tabs adapted to supportingly engage the sleeves of the dial retainer liner so as to stabilize the dialer member as the dialer member slidingly moves through the dial retainer liner.

7. The dripless coupling device of claim 1 wherein the seal means comprises:
 an interiorly disposed stop ring supported by the female body so as to be disposed substantially adjacent the locking tabs, the stop ring adapted to abuttingly engage the dialer member when the male barrel and the male cylinder are disengaged from the female body; and
 an annular flap member supported by the stop ring, the annular flap member adapted to encompass a portion of the dialer member and form a fluid-tight seal between the stop ring and the dialer member when the male barrel and the male cylinder are disengaged from the female body.

8. The dripless coupling device of claim 1 further comprising cap means for threadedly engaging the external threaded end of the female body so as to form a fluid-tight closure therebetween.

9. The dripless coupling device of claim 8 wherein the biasing means is disposed between the cap means and the dialer member, and wherein the biasing means comprises a spring.

10. The dripless coupling device of claim 1 wherein the dialer member comprises an outwardly extending key member positionable within an opening formed in the dial end of the male cylinder such that the male cylinder can be selectively rotated in response to rotation of the dialer member and thereby align the cylinder bore with the male barrel port.

11. The dripless coupling device of claim 1 further comprising closure cap means positionable over the male barrel for effectively sealing the male barrel when same is disconnected from the female body.

12. The dripless coupling device of claim 1 in the male plurality of bleed ports are formed in the male barrel member in the settle end of the male barrel member downstream from the male barrel port.

* * * * *

UNITED STATES PATENT AND TRADEMARK OFFICE
CERTIFICATE OF CORRECTION

PATENT NO. : 5,004,013
DATED : April 2, 1991
INVENTOR(S) : Brook J. Beaston

It is certified that error appears in the above-identified patent and that said Letters Patent is hereby corrected as shown below:

ON THE TITLE PAGE: Column 1, third line of "Related U.S. Application Data" delete "1988, Pat. No. 4,844,450" and substitute therefor --1988, Pat. No. 4,844,408--;

Cover Sheet, Column 2, line 12 of "ABSTRACT", delete "disconnected and" and substitute therefor --disconnected; and--;

Column 8, line 19, after "upstream", begin a new paragraph with "A saucer shaped plunger"; and Column 13, line 15 (claim 1), after "means" and before "to" insert --for biasing the dialer member toward the seal means--.

Signed and Sealed this

Fifteenth Day of December, 1992

Attest:

DOUGLAS B. COMER

Attesting Officer

Acting Commissioner of Patents and Trademarks